United States Patent
Khamatnurova et al.

(10) Patent No.: US 11,421,144 B2
(45) Date of Patent: Aug. 23, 2022

(54) DELAYED RELEASE OF RESIN CURING AGENT

(71) Applicant: Halliburton Energy Services, Inc., Houston, TX (US)

(72) Inventors: Tatyana Khamatnurova, Houston, TX (US); Paul Joseph Jones, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/480,652

(22) PCT Filed: Feb. 27, 2017

(86) PCT No.: PCT/US2017/019708
§ 371 (c)(1),
(2) Date: Jul. 24, 2019

(87) PCT Pub. No.: WO2018/156166
PCT Pub. Date: Aug. 30, 2018

(65) Prior Publication Data
US 2020/0181477 A1    Jun. 11, 2020

(51) Int. Cl.
*C09K 8/80* (2006.01)
*C09K 8/575* (2006.01)
(Continued)

(52) U.S. Cl.
CPC .............. *C09K 8/5756* (2013.01); *B29B 9/08* (2013.01); *B29B 9/16* (2013.01); *C09K 8/80* (2013.01); *B29B 2009/163* (2013.01)

(58) Field of Classification Search
CPC .......... C09K 8/565; C09K 8/57; C09K 8/572; C09K 8/575; C09K 8/5751; C09K 8/5753; C09K 8/5755; C09K 8/5756; E21B 43/267
(Continued)

(56) References Cited

U.S. PATENT DOCUMENTS 3,857,444 A * 12/1974 Copeland ............... C09K 8/565
166/276
4,829,100 A * 5/1989 Murphey ............... C09K 8/805
523/131

(Continued)

FOREIGN PATENT DOCUMENTS

WO    2014151371    9/2014
WO    2016018235    2/2016

OTHER PUBLICATIONS

ISRWO International Search Report and Written Opinion for PCT/US2017/019708 dated Nov. 27, 2017.

*Primary Examiner* — Angela M DiTrani Leff
(74) *Attorney, Agent, or Firm* — Thomas Rooney; C. Tumey Law Group PLLC (57) ABSTRACT

A variety of systems, methods and compositions are disclosed for delayed release of a resin curing agent. An example method may comprise introducing a treatment fluid comprising a resin and delayed release curing agent particulates into a subterranean formation, wherein the delayed release curing agent particulates comprises a carrier, a curing agent disposed on the carrier, and a coating; degrading the coating; and curing the resin in the subterranean formation.

19 Claims, 7 Drawing Sheets

(51) Int. Cl.
    *B29B 9/08*    (2006.01)
    *B29B 9/16*    (2006.01)

(58) Field of Classification Search
    USPC .............................. 166/292, 294, 295, 285
    See application file for complete search history.

(56) References Cited

U.S. PATENT DOCUMENTS

| | | | | |
|---|---|---|---|---|
| 5,368,102 | A * | 11/1994 | Dewprashad | C08G 59/18 166/276 |
| 6,059,035 | A * | 5/2000 | Chatterji | E21B 33/138 166/293 |
| 6,257,335 | B1 * | 7/2001 | Nguyen | C09K 8/685 166/280.2 |
| 6,406,789 | B1 * | 6/2002 | McDaniel | C08K 7/04 166/295 |
| 6,725,931 | B2 * | 4/2004 | Nguyen | C09K 8/68 166/280.2 |
| 7,407,010 | B2 * | 8/2008 | Rickman | C09K 8/64 166/295 |
| 9,206,349 | B2 * | 12/2015 | Turakhia | C09K 8/805 |
| 2003/0045605 | A1 * | 3/2003 | Thompson | C09K 8/12 523/130 |
| 2006/0258546 | A1 * | 11/2006 | Brannon | C09K 8/80 507/269 |
| 2007/0215354 | A1 | 9/2007 | Rickman et al. | |
| 2008/0217010 | A1 * | 9/2008 | Blackburn | C09K 8/80 166/280.2 |
| 2014/0083702 | A1 | 3/2014 | Godfrey et al. | |
| 2014/0311743 | A1 | 10/2014 | Vo et al. | |
| 2015/0122494 | A1 * | 5/2015 | Vo | C09K 8/5753 166/280.2 |

\* cited by examiner

DELAYED RELEASE OF RESIN CURING AGENT

BACKGROUND

During hydraulic fracturing applications, resins may be utilized to provide grain-to-grain contact and strength between individual proppant particles. Conventional epoxy resins based on two component systems may have limited control of the kinetics for resin curing. Therefore, depending on the reactivity of a curing agent, the curing kinetics may lead to premature setting of the resin on surface equipment and/or undesirable parts of the wellbore.

BRIEF DESCRIPTION OF THE DRAWINGS

These drawings illustrate certain aspects of the present disclosure, and should not be used to limit or define the disclosure.

DETAILED DESCRIPTION

The systems, methods, and/or compositions disclosed herein may relate to subterranean operations and, in some systems, methods, and compositions, to providing delayed release curing agent particulates. As used herein, the phrase "delayed release curing agent particulates" refers to a system that at least partially delays the release of the curing agent into a treatment fluid so that curing of the resin is delayed as compared to incorporation of the curing agent into the treatment fluid without the delayed release curing agent particulates. The delayed release curing agent particulates may be utilized with a resin to prevent reactions at surface, and to delay curing of the resin until the resin is in a desired portion of a subterranean formation. This disclosure may directly pertain to a variety of applications that use resin, including, but not limited to, sand consolidation applications, conductive architecture applications in hydraulic fracturing, and cementing applications.

Delayed release curing agent particulates may comprise a curing agent, a carrier, and a coating. The coating may be disposed on a composite particulate of the curing agent and the carrier. The delayed release curing agent particulates may have any suitable particle size, including, but not limited to, may comprise a diameter from about 50 microns to about 5000 microns.

A carrier (e.g., a substrate) may comprise any suitable material for carrying the curing agent downhole. Suitable carriers may include, for example, solid particulates onto which the curing agent may be adsorbed (or otherwise disposed) or polymers with which the curing agent may be blended to form a composite particulate. Combinations of solid particulates and polymers may also be used. Optionally, the curing agent may be blended with any suitable polymer, such as, water-soluble polymers, including, but not limited to, polyvinyl alcohol ("PVA"). The polymer may be selected based on a number of factors, including expected bottomhole temperatures. For example, the polymer may be selected to have a glass transition temperature ($T_g$) that is less than bottomhole temperatures. The polymer may have a glass transition temperature in a range of from about −30° F. (−34° C.) to about 300° F. (149° C.), from about −30° F. (−34° C.) to about 100° F. (38° F.), or from about −10° F. (−23° C.) to about 50° F. (10° F.). Where used in combination with a solid particulate, the polymer may add size to the solid particulate, thereby facilitating subsequent coating of the composite particulate of carrier and the curing agent. Specific examples of suitable carriers may include, but are not limited to, silica, perlite, pumice, calcium carbonate, diatomaceous earth, PVA, polyethylene, polysaccharides, or combinations thereof. The silica may include any of a variety of different silica types, including, but not limited to, amorphous silica, silica fume, precipitated silica, and crystalline silica (e.g., graded sand), among others. The carrier may be in a form of a powder (e.g., free flowing powder) and not a liquid. The carrier may have any suitable particulate size, including, but not limited to comprising a diameter of the carrier of from about 50 microns to about 5000 microns. The carrier may be included, but not limited, in weight ratio of carrier to curing agent of about 10:1 to about 1:1.5.

The curing agent may be any suitable material configured to transform a resin into a hardened mass. As used herein, the term "curing agent" refers to a wide variety of co-reactants that may be reacted (cross-linked) with the resin through a cross-linking reaction commonly referred to as curing. Curing agents may also be referred to as "accelerators," "curatives," "hardeners," or "hardening agents." Examples of suitable hardening agents include, but are not limited to, aliphatic amines, aliphatic tertiary amines, aromatic amines, aromatic tertiary amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, 2,4,6-tris(dimethylaminomethyl)phenol, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, or combinations thereof.

The curing agent may be included in the particulate in an amount sufficient to at least partially harden a resin. Curing times may be about a few hours to about a few days depending on downhole temperature and/or pressure. The curing agent may be included in the delayed release curing agent particulates in any suitable amount, including, but not limited to, from about 5% to about 95% by weight of the delayed release curing agent particulates. Alternatively, the curing agent may be included in the delayed release curing agent particulates in an amount from about 10% to about 90% by weight of the particulate. Those of ordinary skill in the art, with the benefit of this disclosure, should be able to select a type of curing agent and amount of curing agent for a particular application.

The curing agent may also comprise an optional silane coupling agent. The silane coupling agent may be used, among other things, to act as a mediator to aid in bonding a resin to the surface of the subterranean formation and/or the surface of the wellbore.

Examples of suitable silane coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; or combinations thereof.

Generally, the silane coupling agent may be included in the curing agent in an amount to sufficiently bond the resin. The silane coupling agent may be included in the curing agent in the range of about 0.1% to about 95% by volume of the curing agent. Those of ordinary skill in the art, with the benefit of this disclosure, should be able to select a silane coupling agent for a particular application.

The composite particulate comprising the curing agent and the carrier may be coated. The coating may, for example, create a protective shell to prevent premature reaction of the curing agent and resin. The term "coating" as used herein is not intended to imply any specific degree of coating, such as 100% or complete, but instead refers to at least substantial coating of the composite particulate to prevent, or at least partially reduce, premature reactions from occurring. Substantial coating refers to at least 90%, at least 95%, at least 99%, or more of the external surface area of the composite particulate being coated. The coating may be selected to rupture, dissolve, or otherwise degrade at a specific downhole conditions. The delayed release curing agent particulates may provide an adjustable reactivity due to the coating protection that may selected to degrade temperature activated/degraded and/or pressure activated/degraded. The present disclosure is not intended imply any particular mechanism for degradation of the coating, but rather should be broad enough to cover any suitable mechanism in which the coating ruptures, dissolves, or otherwise degrades to release the curing agent into the treatment fluid, such as, for example, hydrolytic degradation or degradation based on temperature and/or pressure.

The coating may comprise any suitable material, such as, for example, polymers, such as polyvinylidene chloride, acrylics (e.g., polyacrylates), and latexes. The coating may have any suitable thickness for a typical application, including but not limited to, a thickness of about 1 nanometer to about 100 microns. Alternatively, the coating may have a thickness of about 1 micron to about 10 micron.

Once the delayed release curing agent particulates are pumped downhole, the coating may degrade, and the curing agent may be released from the carrier, thereby curing resin it may come in contact with. The time for the coating to degrade, thereby releasing the curing agent from the carrier may range for a particular application depending on a number of factors, for example, the coating material and placement location in the well bore. The time for the coating to degrade may range, for example, from 5 minutes to 2 hours (or even longer). Additionally, the coating may allow a controlled release of the curing agent, thereby preventing premature curing of the resin in the wellbore and/or on surface equipment. It should be noted that although a single encapsulated curing is described above, a plurality of particulates may be utilized in accordance with the present disclosure (e.g., delayed release curing agent particulates 217, shown on FIG. 2).

Figure 1:
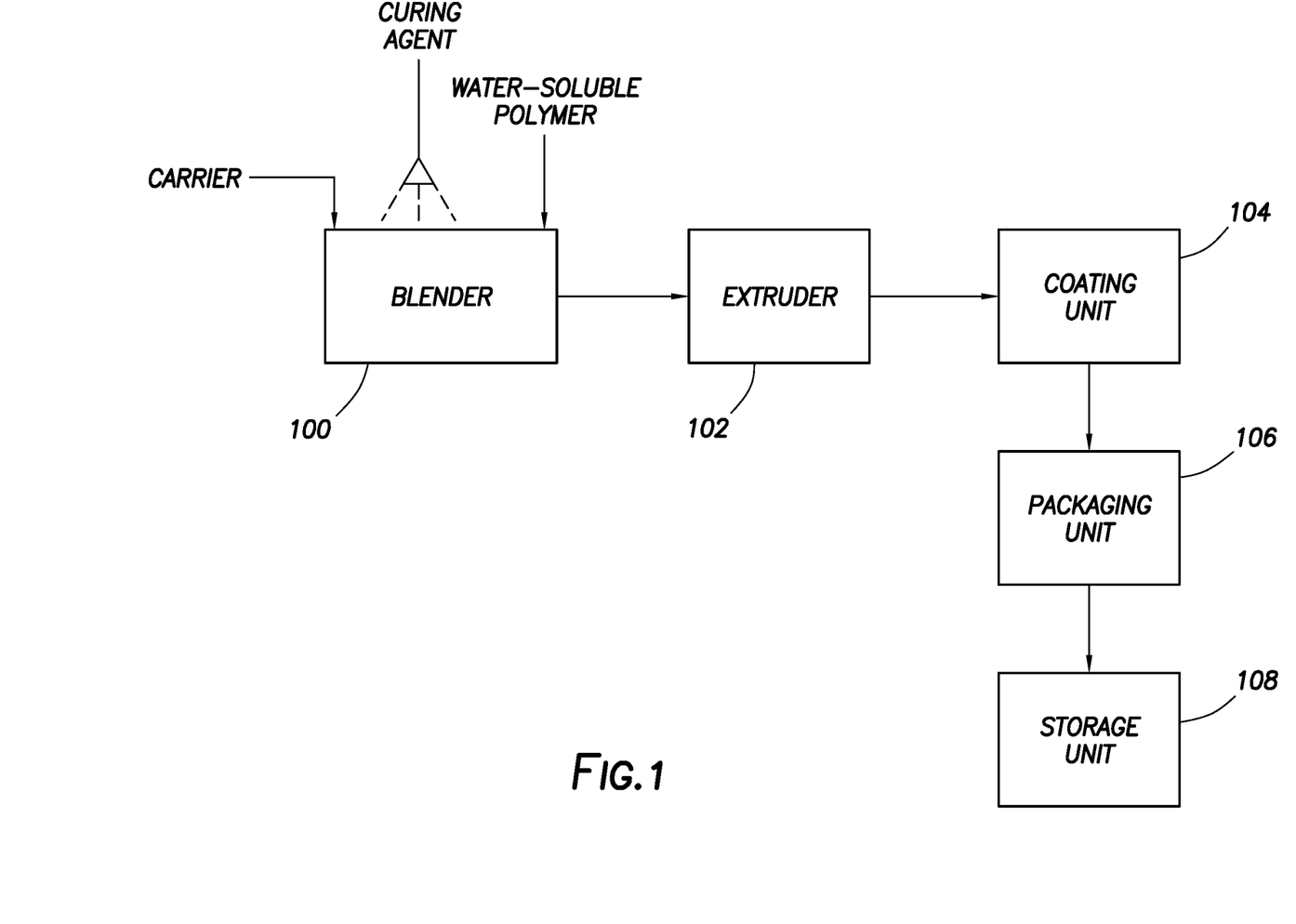
FIG. 1 is an example flow diagram of a production process for delayed release curing agent particulates in accordance with the present disclosure.
Figure 2:
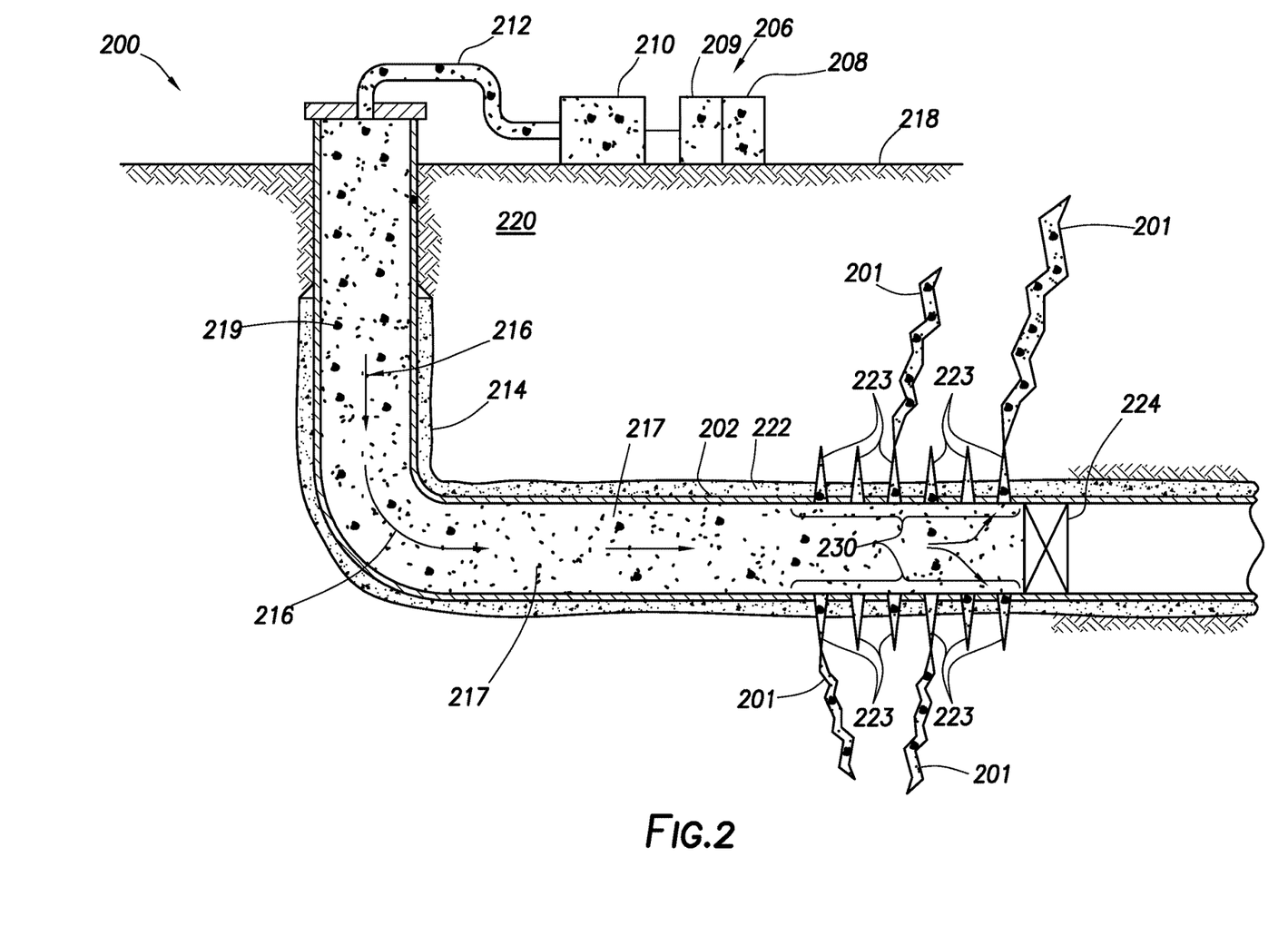
FIG. 2 is a schematic view of an example well system utilized for hydraulic fracturing.

FIG. 1 illustrates an example flow diagram of preparing particulates (e.g., delayed release curing agent particulates 217, shown on FIG. 2). As illustrated, a curing agent and carrier may be introduced into blender 100. Optionally, a polymer (e.g., PVA) may also be introduced into blender 100. Blender 100 may include any suitable device for providing mechanical agitation, including but not limited to, a paddle blender, ribbon blender, or the like. Blender 100 may mix the curing agent, carrier, and/or malleable temperature sensitive polymer for any suitable time. For example, blender 100 may mix these components for about 0.1 minutes to about 5 minutes at a rate of about 50 RPM to about 1,000 RPM. After blending, the curing agent may be adsorbed or otherwise disposed on the carrier. The carrier may remain free flowing. The mixture of the curing agent, carrier, and/or malleable temperature sensitive polymer may be provided from blender 100 to extruder 102 to provide composite particulates of the curing agent, carrier, and/or malleable temperature sensitive polymer. Extruder 102 may include any suitable extruder, including, but not limited to, a twin screw extruder. While extruder 102 is shown, it should be understood that other suitable equipment may be used to form the composite particulates, including pelletizers, tabletizers, and/or agglomerators. The composite particulates may be provided from extruder 102 to coating unit 104, wherein the composite particulates may be coated, as previously described, to form the delayed release curing agent particulates. Any suitable technique may be used to apply the coating in coating unit 104, including, but not limited to, spray coating and fluidized bed techniques. Form coating unit 104, the delayed release curing agent particulates may be provided to sacking unit 106. In sacking unit 106, the delayed release curing agent particulates may be placed in sacks or other suitable storage container and then stored in storage unit 108.

The delayed release curing agent particulates may be used with a resin in any of a variety of applications to prevent (or reduce) undesired reactions at the surface, and to delay curing of the resin until the resin is in a desired portion of a subterranean formation. The delayed release curing agent particulates may be used in well bores that penetrate a subterranean formation. It is to be understood that the term "subterranean formation" encompasses both areas below exposed earth and areas below earth covered by water, such as ocean water or fresh water. Similarly, in some embodiments, the delayed release curing agent particulates may be injected into a subterranean formation comprising coal or shale.

The delayed release curing agent particulates may be utilized with a resin to prevent reactions at surface, and to delay curing of the resin until the resin is in a desired portion of a subterranean formation. This disclosure may directly pertain to a variety of applications that use resin, including, but not limited to, sand consolidation applications, conductive architecture applications in hydraulic fracturing, and cementing applications. Cementing applications may include, but are not limited to, zonal isolations as in water/gas shutoff, lost circulation treatments, remedial casing repairs, sealing of leaking packers, and well abandonment plugs. The delayed release curing agent particulates may be combined with the resin, for example, at the surface, and then the introduced into the subterranean formation. The coating may degrade to release the curing agent such that the curing agent may react with the resin in the subterranean formation. Treatment fluids comprising the resin and delayed release curing agent particulates may be placed into the subterranean formation at a pressure below the fracture pressure of the subterranean formation. Alternatively, the treatment fluids may be placed into the subterranean formation at a pressure above the fracture pressure of the subterranean formation. A person of ordinary skill in the art would be able to determine a fracture pressure for any given subterranean formation.

FIG. 2 illustrates an example well system 200 that may be used for sand consolidation and/or conductive architecture applications during hydraulic fracturing. The well system 200 may include casing 202, a fluid handling system 206, which may include fluid supply 208, mixing equipment 209, pumping equipment 210, and wellbore supply conduit 212. Pumping equipment 210 may be fluidly coupled with the fluid supply 208 and wellbore supply conduit 212 to communicate a treatment fluid 216 containing delayed release curing agent particulates 217 and resin 219 into wellbore 214 via casing 202 (or other suitable conduit). The fluid supply 208 and pumping equipment 210 may be above the surface 218 while the wellbore 214 may be below the surface 218. As described above, delayed release curing agent particulates 217 may comprise a curing agent, a carrier, and a coating. At the surface 218, the delayed release curing agent particulates 217 may be separate from resin 219.

Figure 5:
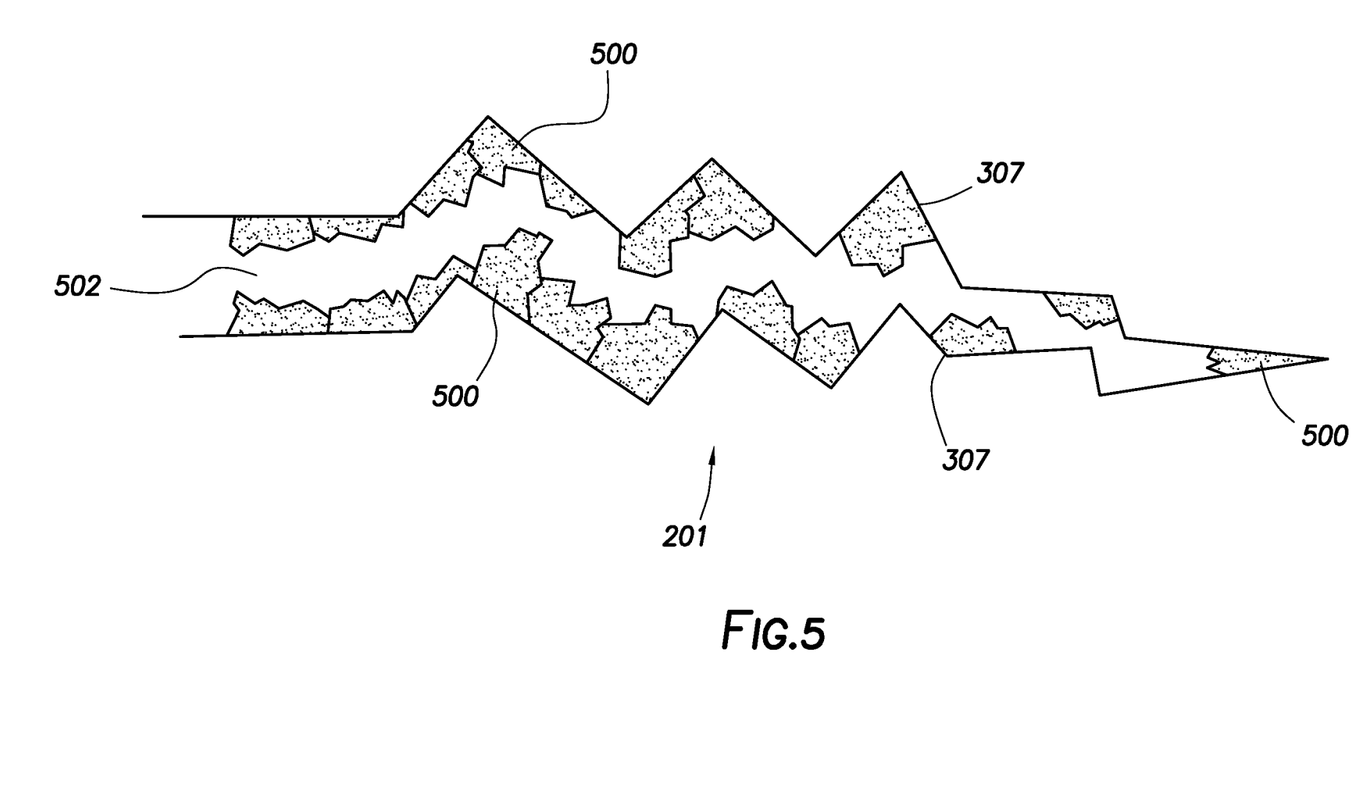
FIG. 5 is a schematic illustration of an example of a conductive architecture within a fracture in accordance with the present disclosure.

Resin 219 may include any resin that is configured to form a hardened, consolidated mass (e.g., cured agglomerates 500, shown on FIG. 5). Resin 219 may include any suitable resins, such as, for example, epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, or combinations thereof.

Selection of a suitable resin may be affected by the temperature of the subterranean formation 220 to which the treatment fluid 216 may be introduced. By way of example, for subterranean formation 220 having a bottom hole static temperature ("BHST") ranging from about 60° F. to about 250° F., epoxy based resins may be utilized. For subterranean formation 220 having a BHST ranging from about 300° F. to about 600° F., a furan based resin may be utilized. For subterranean formation 220 having a BHST ranging from about 200° F. to about 400° F., either a phenolic based resin or a one component high temperature ("HT") epoxy based resin may be utilized. For subterranean formation 220 having a BHST of at least about 175° F., a phenol/phenol formaldehyde/furfuryl alcohol resin may be utilized. It should be understood, however, that the resins may be used outside the specific temperature ranges provided herein. With the benefit of this disclosure, one of ordinary skill in the art should be able to recognize and select a suitable resin for use with the systems, methods and/or compositions of the present disclosure.

The well system 200 may be used for the introduction of the treatment fluid 216 into subterranean formation 220 surrounding the wellbore 214. Generally, a wellbore 214 may include horizontal, vertical, slanted, curved, and other types of wellbore geometries and orientations, and treatment fluid 216 may generally be applied to subterranean formation 220 surrounding any portion of wellbore 214. The wellbore 214 may include casing 202 that may be cemented (or otherwise secured) to a wall of wellbore 214 by cement sheath 222. Perforations 223 may allow the treatment fluid 216 to flow into the subterranean formation 220 (e.g., via fractures 201). As illustrated, perforations 223 may penetrate casing 202 and cement sheath 222, thereby allowing communication between interior of casing 202 and subterranean formation 220. A plug 224, which may be any type of plug for oilfield applications (e.g., bridge plug), may be disposed in wellbore 214 below the perforations 223.

In accordance with systems, methods, and/or compositions of the present disclosure, a perforated interval of interest 230 (depth interval of wellbore 214 including perforations 223) may be isolated with plug 224. The delayed release curing agent particulates 217 and resin 219 may be mixed with water (or other suitable carrier fluid) via mixing equipment 209, thereby forming the treatment fluid 216, and then may be pumped via pumping equipment 210 from fluid supply 208 down the interior of casing 202 and into subterranean formation 220 (e.g., fractures 201). Alternatively, treatment fluid 216 may be pumped down production tubing, coiled tubing, or a combination of coiled tubing and annulus between the coiled tubing and the casing 202. Ratios of carrier fluid to delayed release curing agent particulates 217 and resin 219 may range from about 0.5 lbm/gal (60 kg/m$^3$) to about 5 lbm/gal (600 kg/m$^3$). In fracturing applications, the initial pumping rates may range from about 15 bbl/min to about 80 bbl/min in order to effectively create a fracture (e.g., fracture 201) into the subterranean formation 220. The treatment fluid 216 may also comprise proppant, which may be coated with the resin 219, for example.

The pumping equipment 210 may include a high pressure pump. As used herein, the term "high pressure pump" refers to a pump that may be configured to deliver the treatment fluid 216 downhole at a pressure of about 2000 psi (13790 kilopascal) or greater. A high pressure pump may be used when it is desired to introduce the treatment fluid 216 into subterranean formation 220 at or above a fracture gradient of the subterranean formation 220, but it may also be used in scenarios where fracturing is not desired. Additionally, the high pressure pump may be configured to fluidly convey particulate matter, such as delayed release curing agent particulates 217 and resin 219, into the subterranean formation 220. Suitable high pressure pumps may include, but are not limited to, floating piston pumps and/or positive displacement pumps.

Alternatively, the pumping equipment 210 may include a low pressure pump. As used herein, the term "low pressure pump" refers to a pump that may operate at a pressure of about 2000 psi (13790 kilopascal) or less. A low pressure pump may be fluidly coupled to a high pressure pump that may be fluidly coupled to a tubular (e.g., wellbore supply conduit 212). The low pressure pump may be configured to convey the treatment fluid 216 to the high pressure pump. The low pressure pump may "step up" the pressure of the treatment fluid 216 before it reaches the high pressure pump.

Mixing equipment 209 may include a mixing tank that may be upstream of the pumping equipment 210 and in which the treatment fluid 216 may be formulated. The pumping equipment 210 (e.g., a low pressure pump, a high pressure pump, or a combination thereof) may convey treatment fluid 216 from the mixing equipment 209 or other source of the treatment fluid 216 to the casing 202. Alternatively, the treatment fluid 216 may be formulated offsite and transported to a worksite, in which case the treatment fluid 216 may be introduced to the casing 202 via the pumping equipment 210 directly from its shipping container (e.g., a truck, a railcar, a barge, or the like) or from a transport pipeline. In either case, the treatment fluid 216 may be drawn into the pumping equipment 210, elevated to an appropriate pressure, and then introduced into the casing 202 for delivery downhole.

The treatment fluid 216 may enter the fractures 201 of subterranean formation 220 surrounding wellbore 214 by way of perforations 223. At least a portion of delayed release curing agent particulates 217 and resin 219 may enter fractures 201. Perforations 223 may extend from the interior of casing 202, through cement sheath 222, and into fractures 201. The treatment fluid 216 may be pumped at or above the fracture gradient of the subterranean formation 220. Pumping treatment fluid 216 at or above the fracture gradient of the subterranean formation 220 may create (or enhance) at least one fracture (e.g., fractures 201) in the subterranean formation 220.

After entering fractures 201 of subterranean formation 220, in fracturing applications, for example, pumping equipment 210 may lower the pumping rate to allow the delayed release curing agent particulates 217 and resin 219, together with proppant, to at least partially pack and fill the volume (space) of fractures 201. The lower pumping rates may range from about 1 bbl/min to about 10 bbl/min. Delayed release curing agent particulates 217 and resin 219 may pack about 75% or more, about 50% or more, about 25% or more, or about 10% or more of the volume (space) of fractures 201 ("packing percentages"). The packing percentages of the fractures 201 may differ from one another. The delayed release curing agent particulates 217 and resin 219, together with proppant, may permanently remain in the fractures 201. In the fractures 201, the coating on the delayed release curing agent particulates 217 may degrade, or otherwise fail, releasing encapsulate curing agent 217, which may then undergo a reaction (cross-linking) with resin 219.

In other applications, for example, sand consolidation applications, fractures 201 may not be present. The delayed release curing agent particulates 217 and resin 219 may be introduced into the subterranean formation 220, for example, surrounding wellbore 214. In the subterranean formation 220, the coating on the delayed release curing agent particulates 217 may degrade, or otherwise fail, releasing encapsulate curing agent 217, which may then undergo a reaction (cross-linking) with resin 219. The resin 219 may cure, thus consolidating loose solids (e.g., formation particulates) in the subterranean formation 220.

Figure 3:
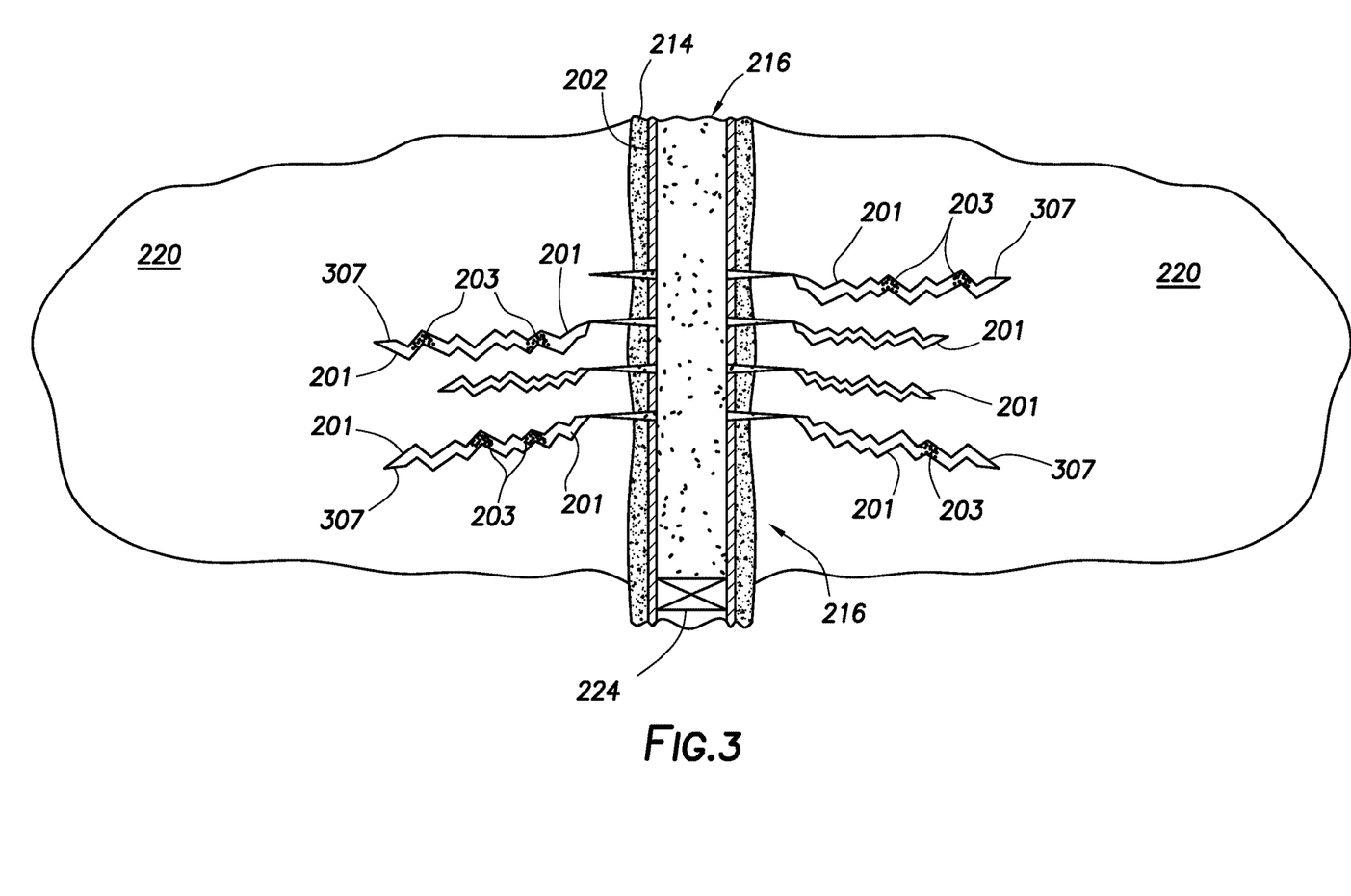
FIG. 3 is a schematic view of an example of a wellbore after displacement of the delayed release curing agent particulates in accordance with the present disclosure.

Referring to FIG. 3, the wellbore 214 is shown after displacement of the treatment fluid 216. As illustrated, the agglomerates 203 may have formed in the fractures 201 that comprise the delayed release curing agent particulates 217 (e.g., FIG. 2), resin 219 (e.g., FIG. 2) and/or proppant. The agglomerates 203 may be utilized, for example, to enhance conductive architecture in the fractures 201. The agglomerates 203 may attach to walls 307 of the fractures 201.

Figure 4:
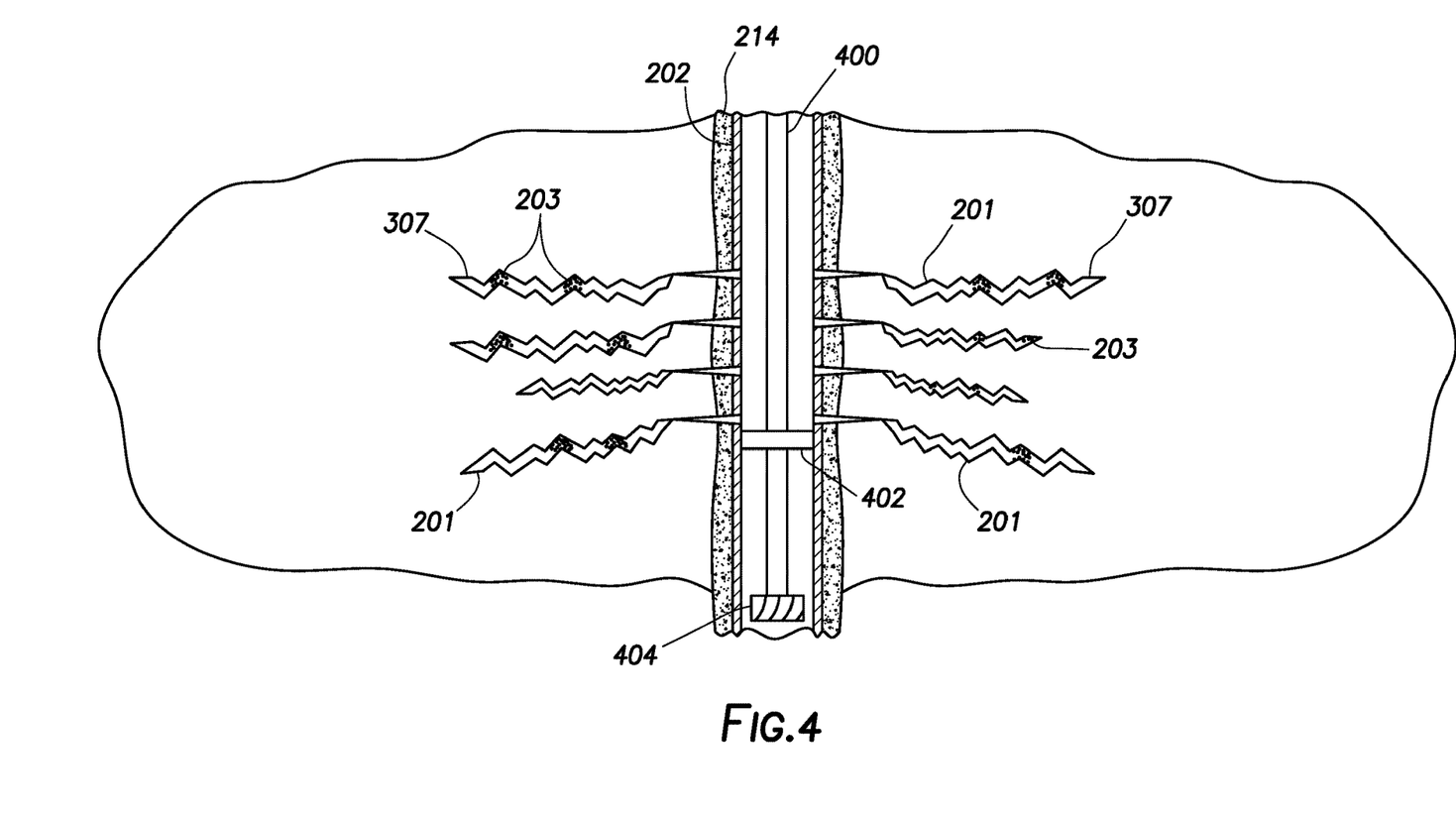
FIG. 4 is a schematic view of an example wellbore drilled and/or reamed out after placement of the delayed release curing agent particulates and resin within a subterranean formation in accordance with the present disclosure.

During and/or after consolidation, the coatings of delayed release curing agent particulates 217 may degrade, thereby releasing the curing agents. The release of the curing agents may cure (e.g., harden) the resin 219, thereby curing the agglomerates 203 within fractures 201 to provide cured agglomerates (e.g., cured agglomerates 500, shown on FIG. 5). Curing times may range from about a few hours to about a few days depending on downhole temperature and/or pressure. Resin curing kinetics may minimize premature curing of the resin 219. The delayed release curing agent particulates 217 and resin 219 that may have filled (during pumping) and cured within the wellbore 214 at the perforated interval of interest 230 may be drilled and/or reamed out with drill string 400, wherein drill string 400 may include reamer 402 and drill bit 404 (shown on FIG. 4).

FIG. 5 illustrates an example of cured agglomerates 500 within a fracture 201. It should be understood that FIG. 5 is merely illustrative and that the cured agglomerates 500 formed by the resin 219 (e.g., FIG. 2) and/or proppant may take on many different forms in the fracture 201. The cured agglomerates 500 may be utilized for conductive architecture by forming conductive channels 502 within fracture 201. The increase in formation compressive strength (e.g., overburden stress of the subterranean formation 220), due to the cured agglomerates 500 wedged within the fracture 201, may be sufficient to withstand drag forces while producing at desired production rates (i.e., the cured agglomerates 500 may stay in place within the fracture 201 during production). Additionally, cured agglomerates 500 that may have attached to walls 307 of fractures 201 may cure against the walls 307, thereby staying in place during production. The cured agglomerates 500 may prevent (or reduce) the migration of solids from fracture 201 into a production stream (e.g., produced hydrocarbons). The permeability of the cured agglomerates 500 may vary depending on a number of factors, including, the particular application and the particular resin. For example, the permeability of the cured agglomerates 500 may range from about 0.01 Darcies to about 200 Darcies.

The configuration of the conductive channels 502 may resemble an "ant farm" or "ant nest." The conductive channels 502 may provide highly conductive flow paths in order to maintain production of the well (e.g., wellbore 214). It should be noted that although cured agglomerates 500 are shown in a single fracture 201, cured agglomerates 500 may be present in more than one fracture 201.

Figure 6A:
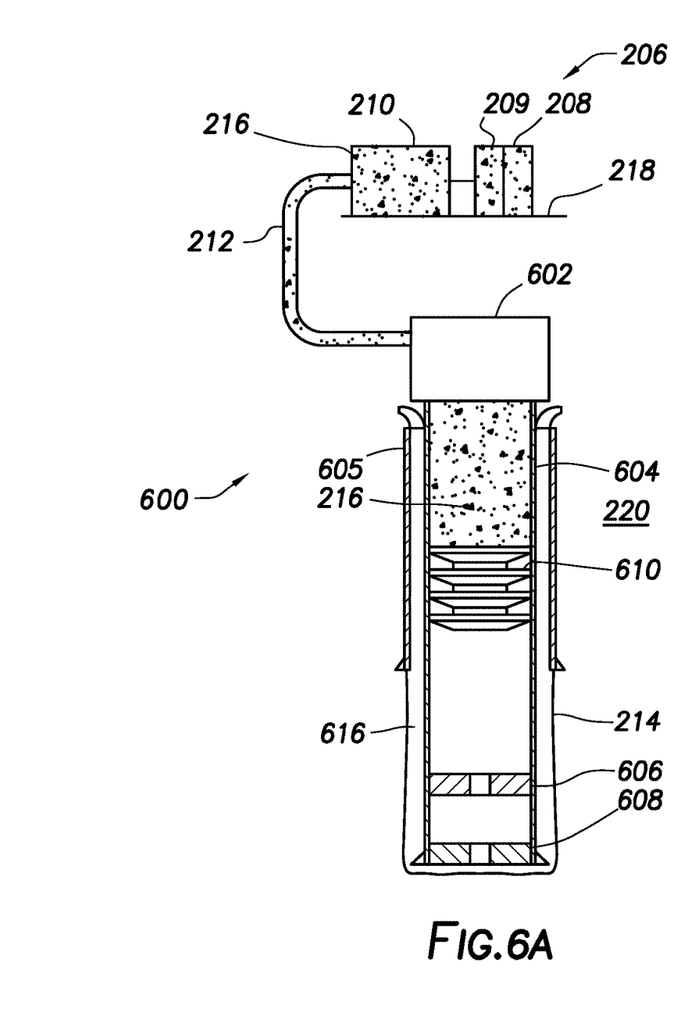
FIGS. 6A-6C are schematic illustrations of an example of a cementing application in accordance with the present disclosure.
Figure 6B:
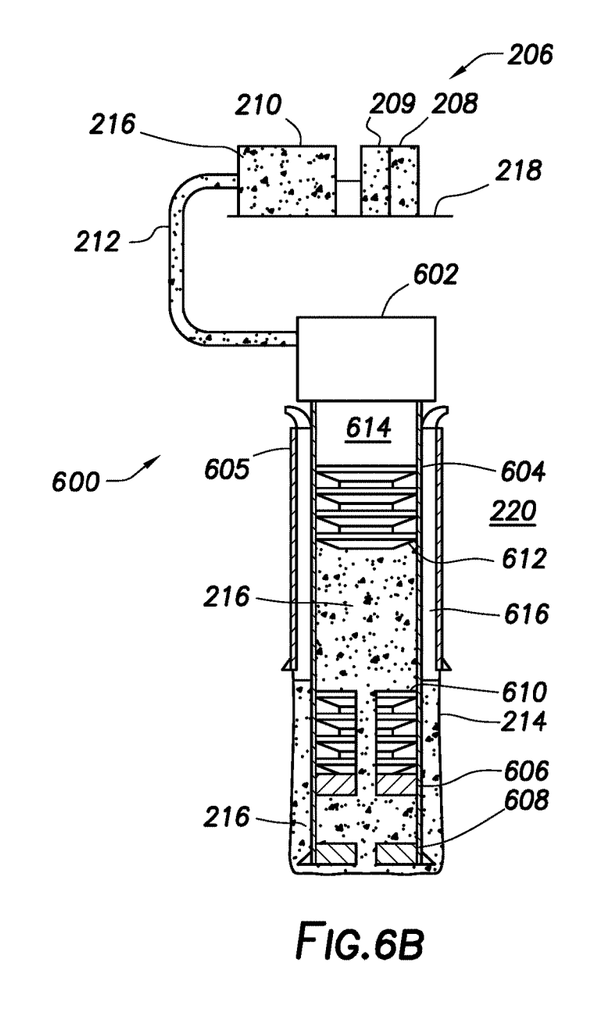
Figure 6C:
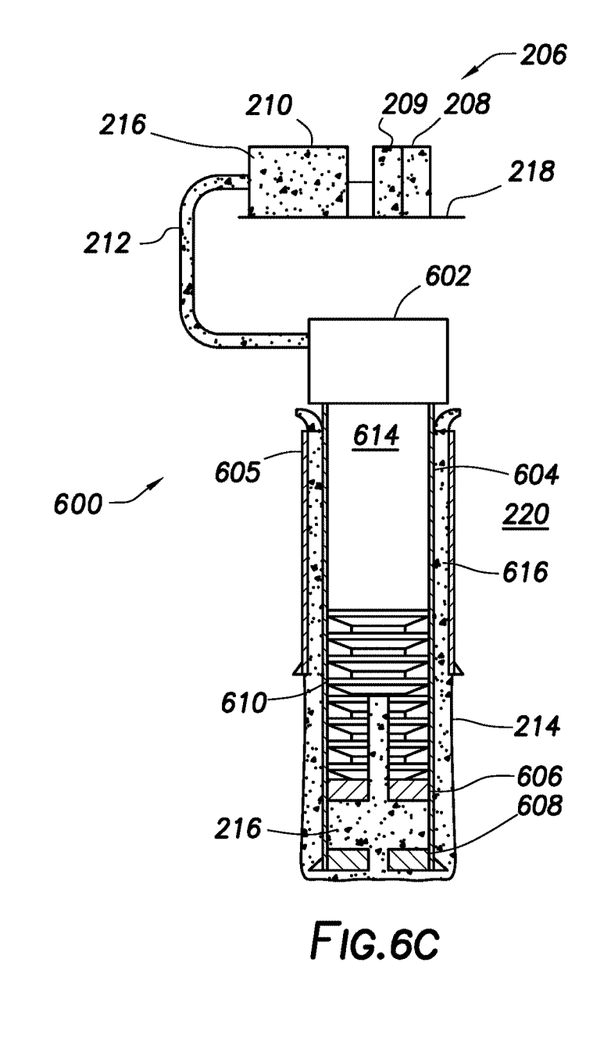

The present disclosure may also pertain to cementing applications. FIGS. 6A-6C illustrate cementing system 600 that may be used for cementing applications utilizing treatment fluid 216, which may contain delayed release curing agent particulates 217 and resin 219. It should be understood that cementing system 600 is merely illustrative of an example system that may be used and the present invention encompasses use of other systems in cementing applications. Solvent may also be used with resin 219 in treatment fluid 216, for example, to reduce the viscosity of the resin 219. The cementing system 600 may include a fluid handling system 206, which may include fluid supply 208, mixing equipment 209, pumping equipment 210, and wellbore supply conduit 212. Wellbore supply conduit 212 may be fluidly coupled to cement head 602. Cement head 602 may be fluidly coupled to tubular 604 (e.g., surface casing). Tubular 604 may be disposed in tubular 605 (e.g., conductor casing). Tubular 605 may be disposed in wellbore 214. Float collar 606 and float shoe 608 may be disposed within tubular 604. Float collar 606 may be positioned above float shoe 608. Cement head 602 may store bottom plug 610 and top plug 612. Bottom plug 610 may have a hollow core, whereas, top plug 612 may have a solid core. Bottom plug 610 may be positioned below top plug 612. Pumping equipment 210 may be fluidly coupled with the fluid supply 208 and wellbore supply conduit 212 to communicate treatment fluid 216 containing delayed release curing agent particulates 217 and resin 219 into tubular 604. The fluid supply 208 and pumping equipment 210 may be above the surface 218 while the wellbore 214 is below the surface 218. As described above, delayed release curing agent particulates 217 may comprise a curing agent, a carrier, and a coating. At the surface 218, the delayed release curing agent particulates 217 may be separate from resin 219, until mixing, for example, in mixing equipment 209.

The delayed release curing agent particulates 217, resin 219, and optional solvent may be mixed via mixing equipment 209, thereby forming treatment fluid 216. Cement head 602 may launch bottom plug 610 into tubular 604. Then treatment fluid 216 may be pumped via pumping equipment 210 from fluid supply 208 through cement head 602 and down the interior of tubular 604, thereby moving bottom plug 610 downwards to the bottom of tubular 604 until it contacts float collar 606, as shown on FIGS. 6A and 6B. The pumping rates may range from about 5 bbl/min to about 20 bbl/min, but pumping rates outside these ranges may also be used for particular applications.

After bottom plug 610 contacts float collar 606, top plug 612 may be launched from cement head 602 into tubular 604 above the treatment fluid 216, as shown on FIG. 6B. After positioning top plug 612 above the treatment fluid 216, a displacement fluid 614 (e.g., brine or drilling mud) may be prepared by mixing equipment 209. The displacement fluid 614 may be pumped down the interior of tubular 604 by pumping equipment 210, thereby moving top plug 612 downwards to the bottom of tubular 604 until it contacts bottom plug 610, as shown on FIG. 6C.

As the top plug 612 moves downward, the treatment fluid 216 may exit the tubular 604 via float shoe 608 and may move upwards along the outside of tubular 604 within the annulus 616, as shown on FIG. 6C. The treatment fluid 216 may at least partially pack and fill the annulus 616, as shown on FIG. 6C.

Figure 7:
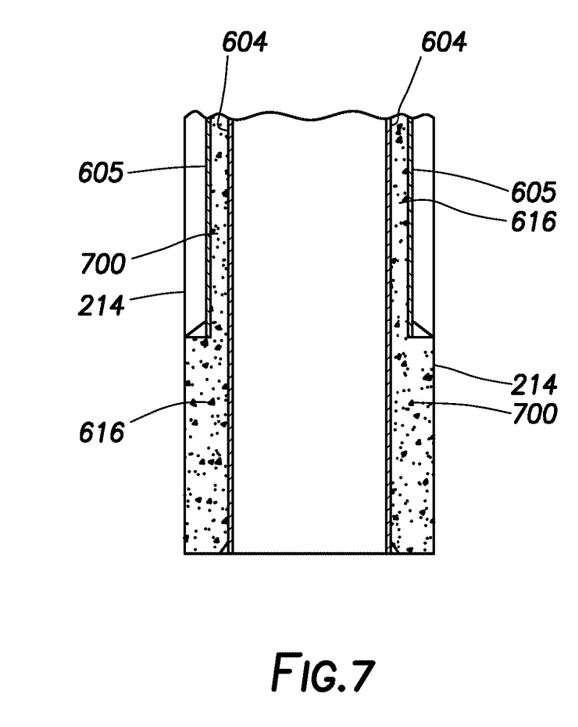
FIG. 7 is a schematic illustration of an example casing string after placement of delayed release curing agent particulates in accordance with the present disclosure.

As described above, the delayed release curing agent particulates 217 may degrade, thereby curing the resin 219 to provide cured resin 700 (as shown on FIG. 7) between tubular 604 and the tubular 605 (e.g., within annulus 616). The cured resin 700 may prevent fluid migration in the annulus 616, support for the tubular 604, and protection of the tubular 604 from corrosive fluids. The cured resin 700 may also seal any leaks (e.g., cracks/fractures) within tubulars 604 and/or 605.

Although FIGS. 6A-6C and 7 illustrate a cementing application for surface casing (e.g., tubular 604) against the conductor casing (e.g., tubular 605), cementing applications in accordance with the present disclosure may additionally include cementing between conductor casing and the formation (e.g., subterranean formation 220), surface casing and intermediate casing, and intermediate casing and production tubing. Also, cementing applications of the present disclosure may include plugging of wells and remedial cementing applications.

Additionally, a solvent may be used with the resin 219. Any solvent that is compatible with the resin and achieves the desired viscosity effect may be suitable for use. Solvents may include those having high flash points (e.g., about 125° F.). Solvents may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, or combinations thereof. Other solvents may include aqueous dissolvable solvents such as, methanol, isopropanol, butanol, glycol ether solvents, or combinations thereof. Suitable glycol ether solvents may also be used. Examples of suitable glycol ether solvents may include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent may be dependent on the resin chosen.

The treatment fluid 216 may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, particulate materials (e.g., proppant) or combinations thereof. With the benefit of this disclosure, one of ordinary skill in the art should be able to recognize and select a suitable additive for use in the treatment fluid 216.

The resin 219 may be included in the treatment fluid 216 in any suitable amount, including, but not limited to, an amount ranging from about 0.1% to about 10% by weight of the treatment fluid 216. The delayed release curing agent particulates 217 may be included in the treatment fluid 216 in any suitable amount, including, but not limited to an amount of about 0.05% to about 5% by weight of the treatment fluid 216.

The treatment fluid 216 that may be used in accordance with the present disclosure may include, for example, aqueous fluids, non-aqueous fluids, slickwater fluids, aqueous gels, viscoelastic surfactant gels, foamed gels, emulsions, or combinations thereof. Suitable aqueous fluids may include fresh water, brine, and/or any other aqueous fluid that may not undesirably interact with the other components used in accordance with the present disclosure. Suitable non-aqueous fluids may include organic liquids, such as hydrocarbons (e.g., kerosene, xylene, toluene, diesel or combinations thereof), oils (e.g., mineral oils, synthetic oils, or combinations thereof), esters, or combinations thereof. Suitable slickwater fluids may be prepared by an addition of polymers to water to produce what is known in the art as "slick-water." Suitable aqueous gels may comprise an aqueous fluid and one or more gelling agents. Suitable emulsions may comprise two immiscible liquids such as an aqueous fluid or gelled fluid and a hydrocarbon. Foams may be created by the addition of a gas, such as carbon dioxide or nitrogen.

Additionally, the treatment fluid 216 may be an aqueous gel comprising an aqueous fluid, a gelling agent for gelling the aqueous fluid and increasing its viscosity, and, optionally, a crosslinking agent for crosslinking the gel and further increasing the viscosity of the treatment fluid 216. The increased viscosity of the gelled, or gelled and crosslinked, treatment fluid, inter alia, may reduce fluid loss and may allow the treatment fluid 216 to transport significant quantities of suspended particulates. The density of the treatment fluid 216 may be increased to provide additional particle transport and suspension in some applications.

In certain systems, methods, and/or compositions of the present disclosure, a friction reducer may be used. The friction reducer may be included in the treatment fluid 216 to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters or combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid 216. The term "polymer" in the context of a friction reducing polymer, may be intended to refer to the acid form of the friction reducing polymer, as well as its various salts.

The friction reducing polymer may be included in the treatment fluid 216, for example, in an amount equal to or less than about 0.2% by weight of the water present in the treatment fluid 216. The friction reducing polymers may be included in the treatment fluid 216 in an amount sufficient to reduce friction without gel formation upon mixing. By way of example, the treatment fluid 216 comprising the friction reducing polymer may not exhibit an apparent yield point. While the addition of a friction reducing polymer may minimally increase the viscosity of the treatment fluid 216, the polymers may generally not be included in the example treatment fluid 216 in an amount sufficient to substantially increase the viscosity. For example, when proppant is included in the treatment fluid 216, velocity rather than fluid viscosity generally may be relied on for proppant transport. Additionally, the friction reducing polymer may be present in an amount in the range from about 0.01% to about 0.15% by weight of the water. Alternatively, the friction reducing polymer may be present in an amount in the range from about 0.025% to about 0.1% by weight of the water.

In some systems, methods, and/or compositions, the treatment fluid 216 may further comprise an additive including, but not limited to, a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a particulate; a lost circulation material; a foaming agent; a gas; a pH control additive; a breaker; a biocide; a crosslinker; a stabilizer; a chelating agent; a scale inhibitor; a mutual solvent; an oxidizer; a reducer; a friction reducer; a clay stabilizing agent, a consolidating agent; a complexing agent; or combinations thereof.

The treatment fluid 216 may also comprise a wide variety of proppants. The proppant may include a variety of materials, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, or combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, graded sand, solid glass, or combinations thereof. Other particulates that may be suitable for use in subterranean applications may also be utilized.

The proppant may have a particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh.

The proppant may be carried by the treatment fluid 216. Without limitation, the proppant may be present in the treatment fluid 216 in a concentration of about 0.1 pounds per gallon (0.01 kg/l) to about 10 pound per gallon (ppg) (1.2 kg/l), about 0.2 ppg (0.02 kg/l) to about 0.6 ppg (0.07 kg/l). These ranges encompass every number in between, for example. The concentration may range between about 0.5 ppg (0.06 kg/l) to about 4 ppg (0.5 kg/l). One of ordinary skill in the art with the benefit of this disclosure should be able to select an appropriate amount of the proppant to use for a particular application.

At least a portion of the subterranean formation 220 may have a permeability ranging from a lower limit of about 0.1 nano Darcy (nD), 1 nD, 10 nD, 25 nD, 50 nD, 200 nD, or 500 nD to an upper limit of about 10 mD, 1 mD, 500 microD, 200 microD, 10 microD, or 500 nD, and wherein the permeability may range from any lower limit to any upper limit and encompass any subset therebetween. The subterranean formation 220 may be considered an ultra-tight formation, for example, having a permeability of about 1 mD or less, which may be a shale formation, sandstone formation, or other type of rock formation.

Accordingly, this disclosure describes systems, compositions, and methods relating to delayed release of a resin curing agent. Without limitation, the systems, compositions and methods may further be characterized by one or more of the following statements:

Statement 1. A method comprising: introducing a treatment fluid comprising a resin and delayed release curing agent particulates into a subterranean formation, wherein the delayed release curing agent particulates comprises a carrier, a curing agent disposed on the carrier, and a coating; degrading the coating; and curing the resin in the subterranean formation.

Statement 2. The method of statement 1, wherein the treatment fluid is introduced into the subterranean formation at or above a fracture pressure.

Statement 3. The method of statement 1 or statement 2, wherein the resin cures to consolidate formation particulates.

Statement 4. The method of any previous statement, wherein the resin cures to form agglomerates of cured resin and proppant in one or more fractures in the subterranean formation.

Statement 5. The method of any previous statement, wherein the resin comprises at least one resin selected from the group consisting of epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof, and wherein the curing agent comprises at least one curing agent selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

Statement 6. The method of any previous statement, wherein the resin is present in the treatment fluid in an amount of about 0.1% to about 10% by weight of the treatment fluid, and wherein the delayed release curing agent particulates are present in the treatment fluid in an amount of about 0.05% to about 5% by weight of the treatment fluid.

Statement 7. The method of any previous statement, wherein the carrier comprises at least one material selected from the group consisting of silica, polyvinyl alcohol, polyethylene, polysaccharides, and combinations thereof.

Statement 8. The method of any previous statement, wherein the resin comprises an epoxy resin, wherein the curing agent comprises an amine, wherein the carrier comprises silica and polyvinyl alcohol, and wherein the coating comprises polyvinylidene chloride, wherein the degrading the coating occurs in the subterranean formation such that the curing agent is released from the carrier and reacts with the resin.

Statement 9. The method of any previous statement, further comprising preparing the delayed release curing agent particulates in a process comprising mixing the carrier and curing agent to form a composite particulate and then applying the coating to the composite particulate.

Statement 10. The method of any previous statement, further comprising preparing the delayed release curing agent particulates in a process comprising mixing components comprising the carrier, a water-soluble polymer, and the curing agent to form a mixture, extruding the mixture to form a composite particulate, and then applying the coating to the composite particulate.

Statement 11. The method of any previous statement, wherein the treatment fluid is introduced into the subterranean formation using one or more pumps.

Statement 12. The method of any previous statement, further comprising mixing components of the treatment fluid using mixing equipment, the components comprising the resin and the delayed release curing agent particulates.

Statement 13. A method comprising: introducing a treatment fluid comprising a resin and delayed release curing agent particulates into a subterranean formation, wherein the delayed release curing agent particulates comprises composite particulates and a coating, wherein the composite particulates comprise a carrier and an amine curing agent, wherein the coating at least substantially coats the composite particulates, wherein the carrier comprises silica and a polymer; degrading the coating; and curing the resin in the subterranean formation.

Statement 14. The method of statement 13, wherein the polymer comprises a polyvinyl alcohol, and wherein the coating comprises polyvinylidene chloride.

Statement 15. The method of statement 13 or statement 14, wherein the resin comprises at least one resin selected from the group consisting of epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof, and wherein the amine curing agent comprises at least one curing agent selected from the group consisting of aliphatic amines, aliphatic tertiary amines, aromatic amines, cycloaliphatic amines, heterocyclic amines, amido amines, polyethyl amines, polyether amines, polyoxyalkylene amines, triethylenetetraamine, ethylene diamine, N-cocoalkyltrimethylene, isophorone diamine, 1,2-diaminocyclohexane, polyetheramine, diethyltoluenediamine, and combinations thereof.

Statement 16. The method of any one of statements 13 to 15, wherein the resin cures to consolidate formation particulates.

Statement 17. The method of any one of statements 13 to 16, wherein the resin cures to form agglomerates of cured resin and proppant in one or more fractures in the subterranean formation.

Statement 18. A treatment fluid comprising: a resin; and delayed release curing agent particulates, wherein the delayed release curing agent particulates comprises a carrier, a curing agent disposed on the carrier, and a coating.

Statement 19. The treatment fluid of statement 18, wherein the resin comprises at least one resin selected from the group consisting of epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof, and wherein the curing agent comprises at least one curing agent selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

Statement 20. The treatment fluid of statement 18 or 19, wherein the resin is present in the treatment fluid in an amount of about 0.1% to about 10% by weight of the treatment fluid, and wherein the delayed release curing agent particulates are present in the treatment fluid in an amount of about 0.05% to about 5% by weight of the treatment fluid.

Statement 21. The treatment fluid of any one of statements 18 to 20, wherein the carrier comprises at least one material selected from the group consisting of silica, polyvinyl alcohol, polyethylene, polysaccharides, and combinations thereof.

Statement 22. The treatment fluid of any one of statements 18 to 21, wherein the treatment fluid further comprises proppant.

The present disclosure is well adapted to attain the ends and advantages mentioned as well as those that are inherent therein. The particular systems, methods, and/or applications disclosed above are illustrative only, as the present disclosure may be modified and practiced in different but equivalent manners apparent to those skilled in the art having the benefit of the teachings herein. Although individual systems, methods, and compositions are discussed, the disclosure covers all combinations of all those systems, methods, and compositions. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative systems, methods, and compositions disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
   mixing a treatment fluid comprising:
      a resin;
      a carrier fluid; and
      delayed release curing agent particulates, wherein the delayed release curing agent particulates comprise composite particulates, wherein the composite particulates comprise an amine curing agent and polyvinyl alcohol blended together to form the composite particulates, and a coating comprising polyvinylidene chloride disposed on the amine curing agent;
   introducing the treatment fluid into a subterranean formation;
   degrading the coating;
   releasing the amine curing agent, wherein the amine curing agent reacts with the resin in the subterranean formation; and
   curing the resin in the subterranean formation,
wherein the composite particulates have a weight ratio of polyvinyl alcohol to amine curing agent of about 10:1 to about 1:1.5.

2. The method of claim 1, wherein the resin comprises at least one resin selected from the group consisting of epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof, and wherein the amine curing agent comprises at least one curing agent selected from the group consisting of aliphatic amines, aliphatic tertiary amines, aromatic amines, cycloaliphatic amines, heterocyclic amines, amido amines, polyethyl amines, polyether amines, polyoxyalkylene amines, triethylenetetraamine, ethylene diamine, N-cocoalkyltrimethylene, isophorone diamine, 1,2-diaminocyclohexane, polyetheramine, diethyltoluenediamine, and combinations thereof.

3. The method of claim 1, wherein the resin cures to consolidate formation particulates.

4. The method of claim 1, wherein the resin cures to form agglomerates of cured resin and proppant in one or more fractures in the subterranean formation.

5. The method of claim 1, wherein the treatment fluid is introduced into the subterranean formation at or above a fracture pressure.

6. The method of claim 1, wherein the resin is present in the treatment fluid in an amount of about 0.1% to about 10% by weight of the treatment fluid, and wherein the delayed release curing agent particulates are present in the treatment fluid in an amount of about 0.05% to about 5% by weight of the treatment fluid.

7. The method of claim 1, wherein the resin comprises an epoxy resin.

8. The method of claim 1, further comprising preparing the delayed release curing agent particulates in a process comprising mixing the amine curing agent and the polyvinyl alcohol to form a mixture and extruding the mixture to form the composite particulates.

9. The method of claim 1, wherein the treatment fluid is introduced into the subterranean formation using one or more pumps.

10. The method of claim 1, wherein the step of mixing comprises mixing the resin, the carrier fluid, and the delayed release curing agent particulates in a mixing tank.

11. A method comprising:
    mixing a treatment fluid comprising:
       a resin;
       a carrier fluid; and
       delayed release curing agent particulates, wherein the delayed release curing agent particulates comprise composite particulates, wherein the composite particulates comprise an amine curing agent and polyvinyl alcohol blended together to form the composite particulates, and a coating comprising polyvinylidene chloride disposed on the amine curing agent, wherein the resin is present in the treatment fluid in an amount of about 0.1% to about 10% by weight of the treatment fluid, and wherein the delayed release curing agent particulates are present in the treatment fluid in an amount of about 0.05% to about 5% by weight of the treatment fluid.;
    introducing the treatment fluid into a subterranean formation;
    degrading the coating;
    releasing the amine curing agent, wherein the amine curing agent reacts with the resin in the subterranean formation; and
    curing the resin in the subterranean formation,
wherein the composite particulates have a weight ratio of polyvinyl alcohol to amine curing agent of about 10:1 to about 1:1.5.

12. The method of claim 11, wherein the resin comprises at least one resin selected from the group consisting of epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof, and wherein the amine curing agent comprises at least one curing agent selected from the group consisting of aliphatic amines, aliphatic tertiary amines, aromatic amines, cycloaliphatic amines, heterocyclic amines, amido amines, polyethyl amines, polyether amines, polyoxyalkylene amines, triethylenetetraamine, ethylene diamine, N-cocoalkyltrimethylene, isophorone diamine, 1,2-diaminocyclohexane, polyetheramine, diethyltoluenediamine, and combinations thereof.

13. The method of claim 11, wherein the resin cures to consolidate formation particulates.

14. The method of claim 11, wherein the resin cures to form agglomerates of cured resin and proppant in one or more fractures in the subterranean formation.

15. The method of claim 11, wherein the treatment fluid is introduced into the subterranean formation at or above a fracture pressure.

16. The method of claim 11, wherein the resin comprises an epoxy resin.

17. The method of claim 11, further comprising preparing the delayed release curing agent particulates in a process comprising mixing the amine curing agent and the polyvinyl alcohol to form a mixture and extruding the mixture to form the composite particulates.

18. The method of claim 11, wherein the treatment fluid is introduced into the subterranean formation using one or more pumps.

19. The method of claim 11, wherein the step of mixing comprises mixing the resin, the carrier fluid, and the delayed release curing agent particulates in a mixing tank.

* * * * *